United States Patent
Hughes et al.

(10) Patent No.: US 11,650,039 B1
(45) Date of Patent: May 16, 2023

(54) HEAD-MEASURING DEVICE

(71) Applicant: Julieta Kevorkian Hughes, Scottsdale, AZ (US)

(72) Inventors: Julieta Kevorkian Hughes, Scottsdale, AZ (US); Adithya Menon, Chicago, IL (US)

(73) Assignee: Julieta Kevorkian Hughes, Scottsdale, AZ (US)

( * ) Notice: Subject to any disclaimer, the term of this patent is extended or adjusted under 35 U.S.C. 154(b) by 156 days.

(21) Appl. No.: 17/333,779

(22) Filed: May 28, 2021

Related U.S. Application Data

(60) Provisional application No. 63/034,707, filed on Jun. 4, 2020.

(51) Int. Cl.
*A61B 5/107* (2006.01)
*G01B 3/38* (2006.01)
*B44D 3/22* (2006.01)

(52) U.S. Cl.
CPC ............. *G01B 3/38* (2013.01); *B44D 3/22* (2013.01)

(58) Field of Classification Search
CPC .............. G01B 3/38; G01B 3/20; G01B 3/24
USPC .................................................... 33/512, 567
See application file for complete search history.

(56) References Cited

U.S. PATENT DOCUMENTS

| | | | | |
|---|---|---|---|---|
| 1,976,045 A | * | 10/1934 | Sorenson .............. | A61C 19/00 33/513 |
| 4,843,720 A | * | 7/1989 | Kim ....................... | G01B 3/20 33/513 |
| 5,303,480 A | * | 4/1994 | Chek ..................... | A61B 5/103 600/587 |
| 5,584,125 A | * | 12/1996 | Prete ..................... | A61M 16/06 33/501.45 |
| 7,955,077 B2 | * | 6/2011 | Shindo .................. | A61C 19/05 33/514 |
| 9,307,930 B2 | * | 4/2016 | Todd ..................... | A61B 5/1075 |
| 9,568,296 B2 | * | 2/2017 | Moore ................... | A61B 5/4312 |
| 10,314,996 B2 | * | 6/2019 | Tang Ee Ho .......... | A61B 5/1072 |
| 11,497,415 B2 | * | 11/2022 | Osawa .................. | A61B 5/1072 |

\* cited by examiner

*Primary Examiner* — George B Bennett
(74) *Attorney, Agent, or Firm* — McDonnell Boehnen Hulbert & Berghoff LLP

(57) ABSTRACT

A head-measuring device is disclosed and includes a support frame. The head-measuring device also includes a plurality of movable arms comprising a first set of movable arms and a second set of movable arms. The first set includes a first outermost arm, the second set includes a second outermost arm opposite the first outermost arm, and each movable arm is movable between a first position and a second position. The head-measuring device also includes a stationary arm coupled to the support frame such that the stationary arm is approximately equidistant between the outermost arms as the outermost arms are moved between the first and second positions. The plurality of movable arms are parallel to each other and to the stationary arm. The first and second sets of movable arms are mechanically linked such that the first set moves synchronously with the second set between the first and second positions.

20 Claims, 14 Drawing Sheets

HEAD-MEASURING DEVICE

BACKGROUND

In drawing or painting a human head, such as in a portrait, an artist typically desires accuracy with respect to how the head is proportioned. That is, the artist typically seeks for the head and face depicted in their painting or drawing to most closely resemble that of their subject. While the proportions of a head can vary, such as based on a person's size or age, anatomical studies made throughout history have helped determine proportions that artists use to this day. For example, artists typically consider the eye line axis to be the halfway point between the top of the skull and the tip of the chin. Other axes, as well as the distances therebetween, are often considered as well, such as the hairline axis, eyebrow axis, and mouth axis.

Despite the use of commonly-considered proportions, it often takes more time than desired for an artist to correctly place each of these and other axes while also considering the head's particular size and shape, as well as considering the way the subject is facing (e.g., looking forward, facing sideways). This time spent often involves guess work and numerous corrections to axis placement, as many artists can be unaware of the distance between the axes.

Accordingly, a practical, simpler, and less time consuming way to accurately draw head proportions is desired.

SUMMARY

According to an example arrangement, a head-measuring device is disclosed. The head-measuring device includes a support frame. The head-measuring device also includes a plurality of movable arms comprising a first set of movable arms and a second set of movable arms, where the first set of movable arms includes a first outermost arm, where the second set of movable arms includes a second outermost arm opposite the first outermost arm, and where each movable arm is movable between a first position and a second position. The head-measuring device also includes a stationary arm coupled to the support frame such that the stationary arm is approximately equidistant between the first outermost arm and the second outermost arm as the first outermost arm and the second outermost arm are moved between the first positions and the second positions. The plurality of movable arms are parallel to each other and to the stationary arm. The first set of movable arms and the second set of movable arms are mechanically linked such that the first set of movable arms move synchronously with the second set of movable arms between the first positions and the second positions.

According to another example arrangement, a method for assembling a head-measuring device is disclosed. The method includes mechanically linking a first set of movable arms of a plurality of movable arms to a second set of movable arms of the plurality of movable arms, where the first set of movable arms includes a first outermost arm, and where the second set of movable arms includes a second outermost arm opposite the first outermost arm. The method also includes coupling the plurality of movable arms to a support frame such that each movable arm is movable relative to the support frame between a first position and a second position. The method also includes coupling a stationary arm to the support frame such that the stationary arm is approximately equidistant between the first outermost arm and the second outermost arm as the first outermost arm and the second outermost arm are moved between the first positions and the second positions. The plurality of movable arms are parallel to each other and to the stationary arm. The first set of movable arms and the second set of movable arms are mechanically linked such that the first set of movable arms move synchronously with the second set of movable arms between the first positions and the second positions.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
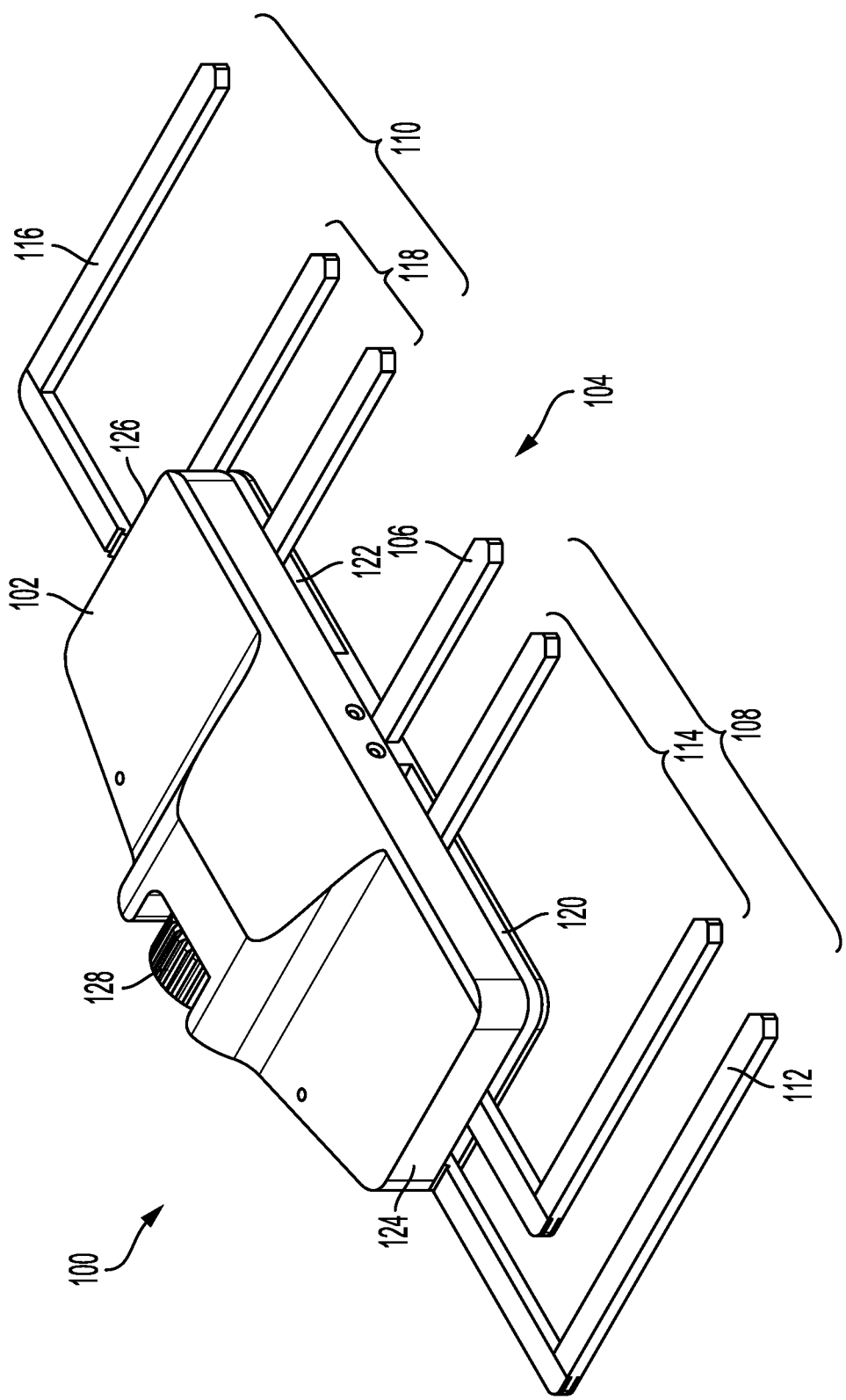
FIG. 1 is a perspective view of a head-measuring device, in accordance with an example embodiment.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

The present disclosure provides a head-measuring device that improves over existing techniques for drawing head proportions by assisting artists with finding the correct placement of various axes associated with a human head. Examples of such axes that will be discussed herein include, a top of skull axis, a hairline axis, an eyebrow axis, an eye axis, a nose axis, a mouth axis, and a tip of chin axis. To assist artists in this way, the disclosed head-measuring device includes mechanically-linked arms, a portion of which are synchronously movable such that the relative positions of all of the arms correspond to the proportions of a human head and are maintained during the synchronous movement of the arms. That is, the arms of the head-measuring device can distinctly and accurately point to where the various axes of the human head should be drawn relative to one another. Thus, the head-measuring device can reduce or eliminate the guesswork, incorrect placement of these axes, and repeated corrections that typically occur in practice, thereby helpfully reducing the time spent drawing while facilitating the completion of accurate drawings. These and other advantages can be achieved using the head-measuring device for drawing human heads with faces looking forwards, on profile, or facing sideways, among other possible angles.

FIG. 1 is a perspective view of an example of a head-measuring device 100, in accordance with an example embodiment. The head-measuring device 100 includes a support frame 102, a plurality of movable arms 104, and a stationary arm 106 coupled to the support frame 102. As shown, the plurality of movable arms 104 are parallel to each other and to the stationary arm 106.

The support frame 102 can be or include a physical frame to which one or more other components of the head-measuring device 100 can be coupled. In some examples, the support frame 102 can be a housing that at least partially encloses at least a portion of the components of the head-measuring device 100. The support frame 102 can be made of plastic, metal, and/or one or more other materials. In some examples, the support frame 102 can include multiple components that are mechanically coupled (e.g., fastened, snap-fit, or another technique for coupling two or more components). For instance, the housing in FIG. 1 can be formed by fastening (e.g., with screws) two pieces together. Other examples are possible as well, including housings of other shapes and sizes.

The plurality of movable arms 104 include a first set of movable arms 108 and a second set of movable arms 110. The first set of movable arms 108 includes a first outermost arm 112 (e.g., one of the two arms of the plurality of movable arms 104 that are outermost with respect to the other arms of the head-measuring device 100) and a first subset of movable arms 114 positioned between the stationary arm 106 and the first outermost arm 112. The second set of movable arms 110 includes a second outermost arm 116 (e.g., the other of the two arms of the plurality of movable arms 104 that are outermost with respect to the other arms of the head-measuring device 100) and a second subset of movable arms 118 positioned between the stationary arm 106 and the second outermost arm 116. As shown, the first subset of movable arms 114 and the second subset of movable arms 118 each include two movable arms, but in other embodiments, each such subset could include more or less movable arms. The plurality of movable arms 104 can be made of various materials, such as plastic or metal.

As further shown, the support frame 102 includes a pair of slots disposed in the support frame 102, a first slot 120 of which wraps around one side of the support frame 102 and at least partially houses the first set of movable arms 108, and the second slot 122 of which wraps around another side of the support frame 102 and at least partially houses the second set of movable arms 110.

Each movable arm of the plurality of movable arms 104 can be movable between a first position and a second position. The range of movement of each movable arm between the first position and the second position can be defined by physical properties of the support frame 102 (e.g., the pair of slots) and/or by physical properties (e.g., the lengths) of the movable arms themselves. For example, as shown later in FIG. 4, the support frame 102 can include or otherwise define a plurality of tracks 127 (not shown in FIG. 1) that limit both lateral and longitudinal movement of the plurality of movable arms 104. Other examples are possible as well.

FIG. 1 shows the plurality of movable arms 104 in the first position—that is, a position that is the maximum distance from the second position that the plurality of movable arms 104 can move. In some examples, the support frame 102 can have a length selected from a range of 20.32 centimeters (cm) (i.e., 8 inches (in)) to 35.56 cm (i.e., 14 inches), such as 30.48 cm (i.e., 12 in), in which case the distance between the first outermost arm 112 and the second outermost arm 116 in their respective second positions can be approximately 30.48 cm, or 25.4 cm (i.e., 10 in), in which case the distance between the first outermost arm 112 and the second outermost arm 116 in their respective second positions can be approximately 25.4 cm. Other lengths are possible as well in other embodiments.

The stationary arm 106 can be attached (e.g., soldered, fastened) to the support frame 102 directly or can be attached to another, separate component that is, in turn, attached to, disposed in, or housed by the support frame 102. The stationary arm 106 can be coupled to the support frame 102 such that the stationary arm 106 is approximately equidistant between the first outermost arm 112 and the second outermost arm 116 as the first outermost arm 112 and the second outermost arm 116 are moved between the first positions and the second positions. That is, regardless of where the first outermost arm 112 and the second outermost arm 116 are moved between their respective first positions and second positions, the distance between the stationary arm 106 and each outermost arm will be the same. FIG. 1 also shows the stationary arm 106 as being approximately equidistant between the two far ends 124, 126 of the support frame 102. In other examples, the stationary arm 106 can be coupled to the support frame 102 such that the stationary arm 106 is approximately equidistant between the two far ends 124, 126 of the support frame 102, but might not be equidistant between the first outermost arm 112 and the second outermost arm 116 throughout the entire movement of the first outermost arm 112 and the second outermost arm 116 between the first positions and the second positions. The stationary arm 106 can be made of various materials, such as plastic or metal. In some variations of the head-measuring device 100, the stationary arm 106 might not be included.

The first set of movable arms 108 and the second set of movable arms 110 can be mechanically linked such that the first set of movable arms 108 move synchronously with the second set of movable arms 110 between the first positions and the second positions. More particularly, in the context of head proportions, the first set of movable arms 108 and the second set of movable arms 110 can be mechanically linked such that relative positions between the plurality of movable arms 104 correspond to predetermined proportions associated with a human head and maintain those predetermined proportions during the synchronous movement of the first set of movable arms 108 with the second set of movable arms 110.

Each movable arm of the plurality of movable arms 104 can correspond to a respective axis of a human head, such as a top of skull axis, a hairline axis, an eyebrow axis, a nose axis, a mouth axis, or a tip of chin axis. For example, as shown in FIG. 1, the first outermost arm 112 corresponds to a top of skull axis of the human head, the left arm of the first subset of movable arms 114 corresponds to the hairline axis, the right arm of the first subset of movable arms 114 corresponds to the eyebrow axis, the left arm of the second subset of movable arms 118 corresponds to the nose axis, the right arm of the second subset of movable arms 118 corresponds to the mouth axis, and the second outermost arm 116 corresponds to the tip of chin axis.

In addition, the stationary arm 106 can correspond to an axis of the human head as well, such as an eye axis. Thus, FIG. 1 shows, in order from left to right (e.g., from end 124 to end 126), a top of skull axis, a hairline axis, an eyebrow axis, an eye axis, a nose axis, a mouth axis, and a tip of chin axis. In variations of the head-measuring device 100, more or less arms (and thus, corresponding axes) can be included. As shown in FIG. 1, the name of each axis can be etched into, printed on, or otherwise visually represented by its respective movable arm of the plurality of movable arms 104.

In examples where the first subset of movable arms 114 includes one arm instead of two, that arm might correspond to the hairline axis, the eyebrow axis, or another axis. And in examples where the second subset of movable arms 118 includes one arm instead of two, that arm might correspond to the nose axis, the mouth axis, or another axis. The first subset of movable arms 114 and/or the second subset of movable arms 118 can include more than two arms in other examples. In other examples, the plurality of movable arms 104 might only include the first outermost arm 112 and the second outermost arm 116.

The head-measuring device 100 of FIG. 1 is also shown to include an actuator 128, which can be coupled to or integrated as part of the support frame 102. The actuator 128 can be or include a rotatable knob, a push button, or other actuating device that can cause movement of the plurality of movable arms 104. In some examples, the actuator 128 can be or include a shaft to which the plurality of movable arms 104 can be directly or indirectly coupled. In a more specific example, the actuator 128 might include a knob coupled to a shaft via a set screw or other fastening method.

Although examples herein are primarily described as including mechanical actuation of the plurality of movable arms 104, it should be understood that actuation of the plurality of movable arms 104 can additionally or alternatively be achieved with an electro-mechanical device, which can include one or more electronic components and one or more mechanical components. For example, the actuator 128 can be or include an electric linear actuator that moves the plurality of movable arms 104. As another example, the actuator 128 can be or include a small motor or servo motor instead of a rotatable knob. As yet another example, the actuator 128 can be or include a button or switch that facilitates battery-operated movement of the plurality of movable arms 104.

Figure 2:
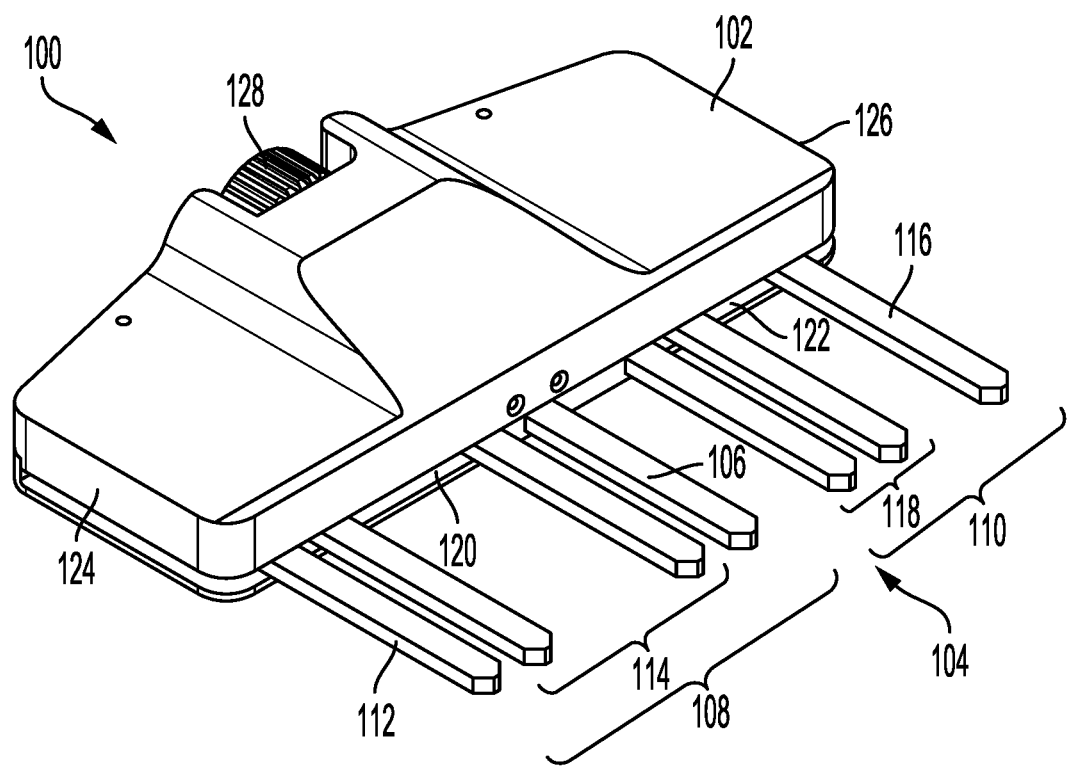
FIG. 2 is another perspective view of the head-measuring device of FIG. 1, in accordance with an example embodiment.

FIG. 2 is a perspective view of the head-measuring device 100 with the plurality of movable arms 104 in the second position. When in the second position, for instance, the first set of movable arms 108 might not be able to move any farther to the right, and the second set of movable arms 110 might not be able to move any farther to the left.

Examples of how the plurality of movable arms 104 can be mechanically linked will now be described in more detail. In particular, a gear arrangement is shown and described with respect to FIGS. 3-9 as a representative example of how the plurality of movable arms 104 can be mechanically linked. An alternative gear arrangement is then shown and described with respect to FIGS. 10-13. It should be understood, however, that other gear arrangements, other mechanisms, and/or other techniques are possible as well to achieve the herein-disclosed movement of the plurality of movable arms 104. Moreover, the first set of movable arms 108 and the second set of movable arms 110 can be linked in non-mechanical ways, in addition or alternatively to being mechanically linked. For example, the first outermost arm 112 could be electrically coupled (e.g., via circuitry) to the second outermost arm 116 such that actuation (e.g., a push button) of the head-measuring device 100 sends a signal that activates a motor that synchronously moves at least the first outermost arm 112 and the second outermost arm 116. Other examples are possible as well.

Figure 3:
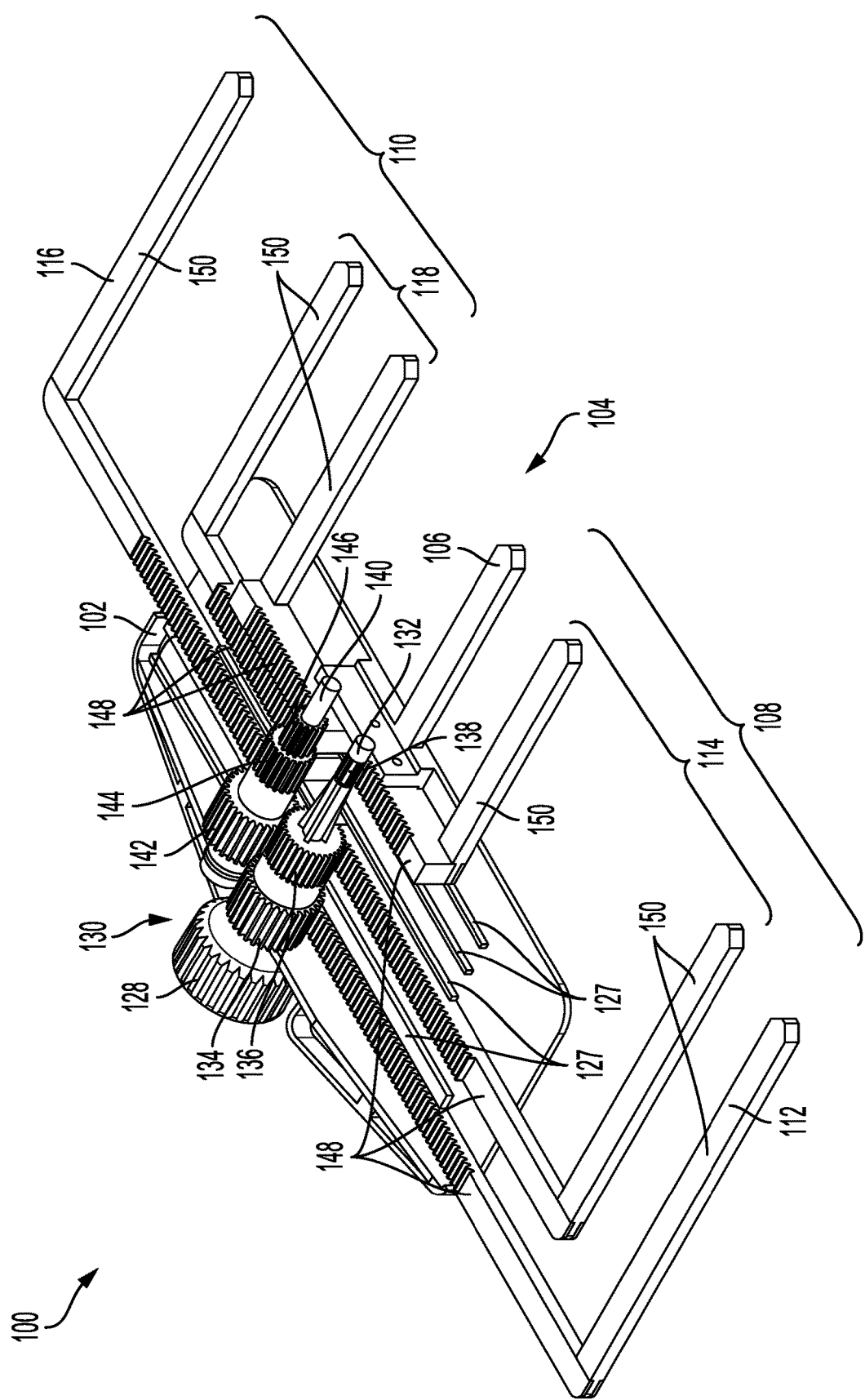
FIG. 3 is another perspective view of the head-measuring device of FIG. 1, in accordance with an example embodiment.

FIG. 3 is another perspective view of the head-measuring device 100 in the first position, particularly a version of the head-measuring device 100 where a top portion of the support frame 102 housing is removed to show what is inside. In particular, the head-measuring device 100 is shown to include a plurality of gears 130 that are coupled to the support frame 102. In examples where the support frame 102 is a housing, the plurality of gears 130 can be at least partially disposed within the housing.

The first set of movable arms 108 and the second set of movable arms 110 can be mechanically linked by the plurality of gears 130. The actuator 128 is shown to be attached to a first shaft 132 on which three gears of the plurality of gears 130 are disposed, namely, gear 134, gear 136, and gear 138. In alternative embodiments, the actuator 128 can be attached to the second shaft 140. Attached to the first shaft 132 is a second shaft 140 on which the other three gears of the plurality of gears 130 are disposed, namely, gear 142, gear 144, and gear 146. The first shaft 132 and the second shaft 140 are each configured to rotate the plurality of gears 130 and cause the synchronous movement of the first set of movable arms 108 with the second set of movable arms 110. The number of gears can vary depending on how many movable arms are included as part of the head-measuring device 100.

FIG. 3 also shows the plurality of tracks 127 referred to above. The plurality of tracks 127 constrain movement of the plurality of movable arms 104 and can prevent the plurality of movable arms 104 from falling out of the head-measuring device 100. In some examples, each movable arm can have a respective track of the plurality of tracks 127 along which the movable arm moves.

As further shown in FIG. 3, each movable arm of the plurality of movable arms 104 can include a first elongated portion 148 including arm teeth engaged with gear teeth of a respective gear of the plurality of gears 130, and can further include a second elongated portion 150 that defines a respective axis of a human head. The second elongated portions 150 of the plurality of movable arms 104 can be parallel to each other and to the stationary arm 106, as shown. The engagement between the gear teeth of the first elongated portions 148 and the plurality of gears 130 can achieve translation of rotational motion (e.g., of the actuator 128) into linear motion of the plurality of movable arms 104. As so configured, a single actuation (e.g., rotation) of the actuator 128 can allow the first set of movable arms 108 to move in one direction with respect to the stationary arm 106 and the second set of movable arms 110 to move in the opposite direction with respect to the stationary arm 106.

It should be understood that alternative mechanisms can be used to actuate movement of the plurality of movable arms 104. The first elongated portions 148 can be at least partially disposed on or within the support frame 102 (e.g., within a housing). In some examples, such as the example shown in FIG. 4, the first elongated portions 148 are substantially perpendicular to the second elongated portions 150. In other examples, the first elongated portions 148 can be positioned in another manner relative to the second elongated portions 150.

In alternative embodiments, any one or more of the plurality of movable arms 104 can have a shape and/or size different from those shown in the Figures. For example, in some embodiments, the second elongated portions 150 of the plurality of movable arms 104 can each have a triangular shape (e.g., a triangular prism), which can facilitate the use of the head-measuring device 100 for both right-handed and left-handed individuals. In particular, such arms could be shaped such that a surface of each arm (e.g., a rectangular surface of a triangular prism) could be placed onto a drawing paper or other drawing surface with the arms pointing to the right or left. This can enable both right-handed and left-handed artists to use the device comfortably, as well as give an artist flexibility to be able to point the arms in more than one direction, which can produce more accurate results in completing a drawing (e.g., a portrait).

Further, in some embodiments, any one or more of the plurality of movable arms 104 can be comprised at least in part of a transparent material such as glass or an optical polymer, so as to facilitate an individual being able to see a drawing surface through at least a portion of the plurality of movable arms 104. Other materials are possible as well, both transparent and opaque.

Figure 4:
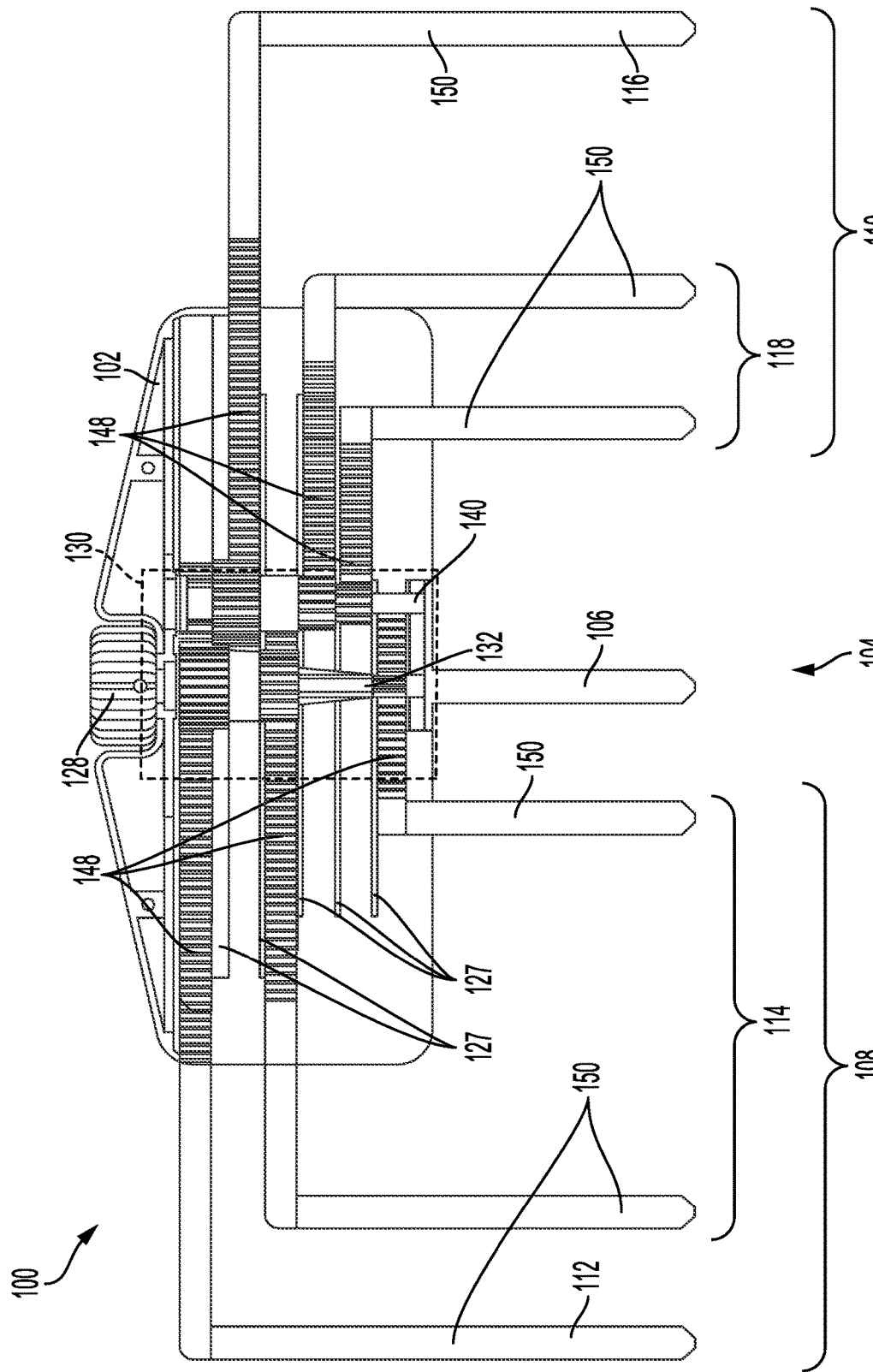
FIG. 4 is a top-down view of the head-measuring device of FIG. 1, in accordance with an example embodiment.
Figure 5:
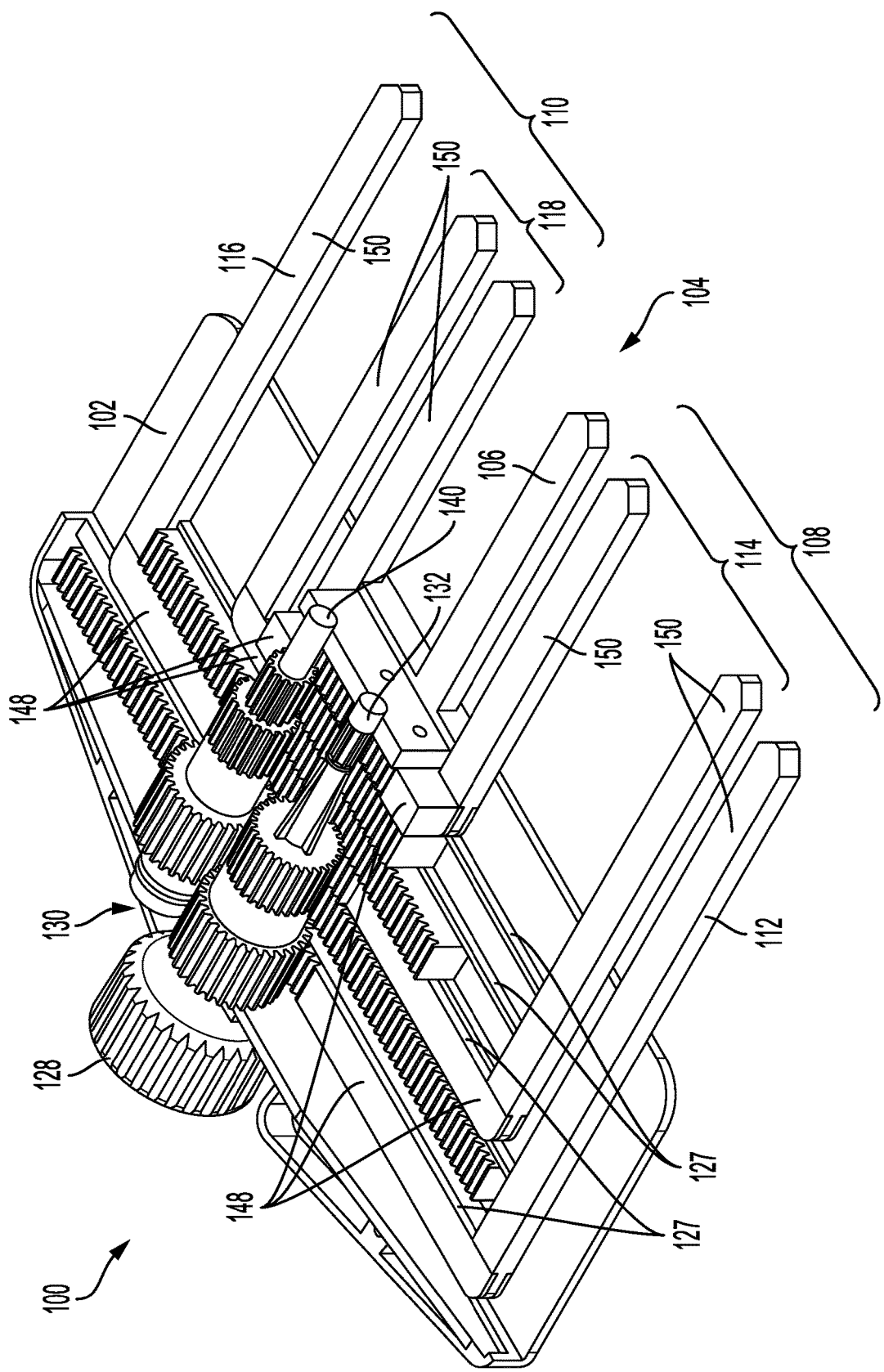
FIG. 5 is another perspective view of the head-measuring device of FIG. 1, in accordance with an example embodiment.
Figure 6:
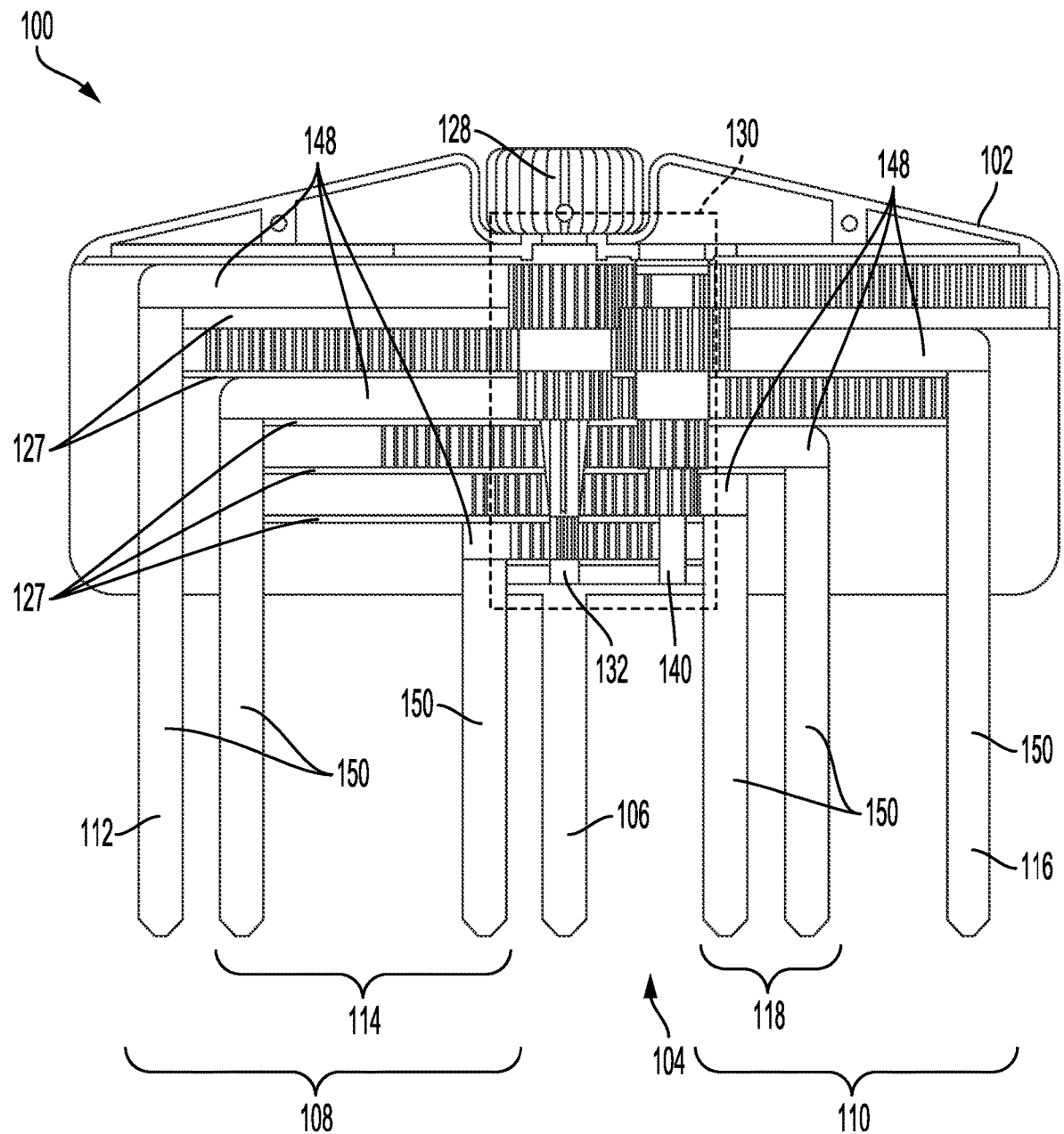
FIG. 6 is another top-down view of the head-measuring device of FIG. 1, in accordance with an example embodiment.

FIGS. 4, 5, and 6 show additional views of the head-measuring device 100.

Specifically, FIG. 4 is a top-down view of the head-measuring device 100 in the first position, FIG. 5 is a perspective view of the head-measuring device 100 in the second position, and FIG. 6 is another perspective view of the head-measuring device 100 in the first position. In FIGS. 4 and 6, the plurality of gears 130 are designated with a dotted rectangle.

Figure 8:
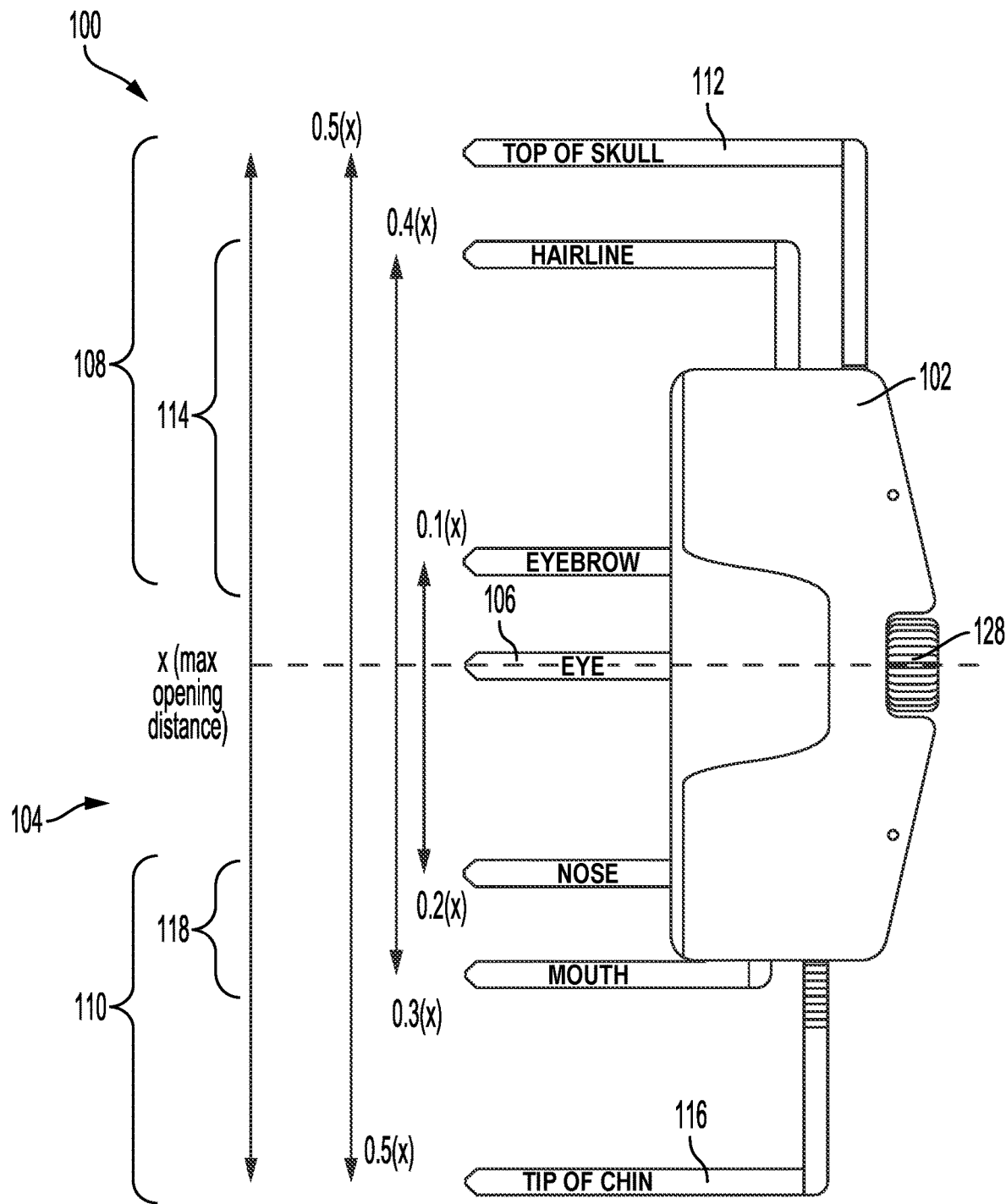
FIG. 8 is another top-down view of the head-measuring device of FIG. 1, in accordance with an example embodiment.
Figure 9:
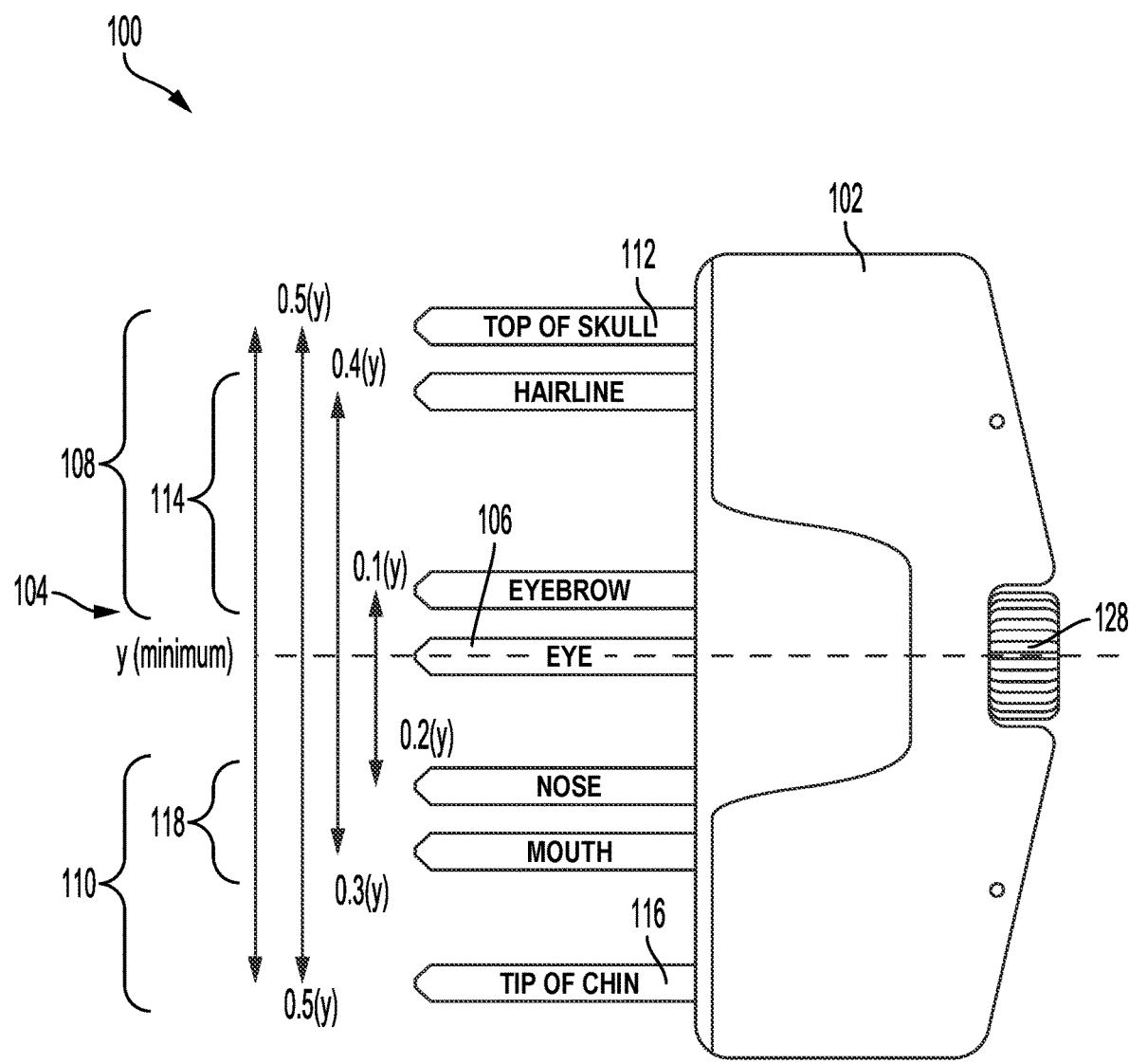
FIG. 9 is another top-down view of the head-measuring device of FIG. 1, in accordance with an example embodiment.

An example manner of achieving desired predetermined proportions will now be described in more detail with respect to FIGS. 7, 8, and 9.

The following example and associated Figures assume a human head of height h, defined as the distance from the tip of the chin to the top of the skull. The following example and associated Figures also assume that the eye axis is approximately located at the midpoint between the tip of chin axis and the top of skull axis. The distance traveled by each of the plurality of movable arms 104 will thus be described with respect to the eye axis. Furthermore, the predetermined proportions described herein are represented as percentages and corresponding decimals, each of which corresponds to how far from the eye axis a particular movable arm travels to achieve the predetermined proportions for a head of height h. In particular, for a head of height h, the proportional percentage, P, for a particular arm/axis is represented by Equation 1 below, where t is the distance between the particular arm/axis and the eye axis (with the eye axis serving as the point of origin).

$$P=(|t|/h)*100 \quad \text{(Equation 1)}$$

In an example, and as shown in the Figures herein, the predetermined proportions are as follows: 50% for the top of skull axis, 40% for the hairline axis, 10% for the eyebrow axis, 20% for the nose axis, 30% for the mouth axis, and 50% for the tip of chin axis.

Figure 7:
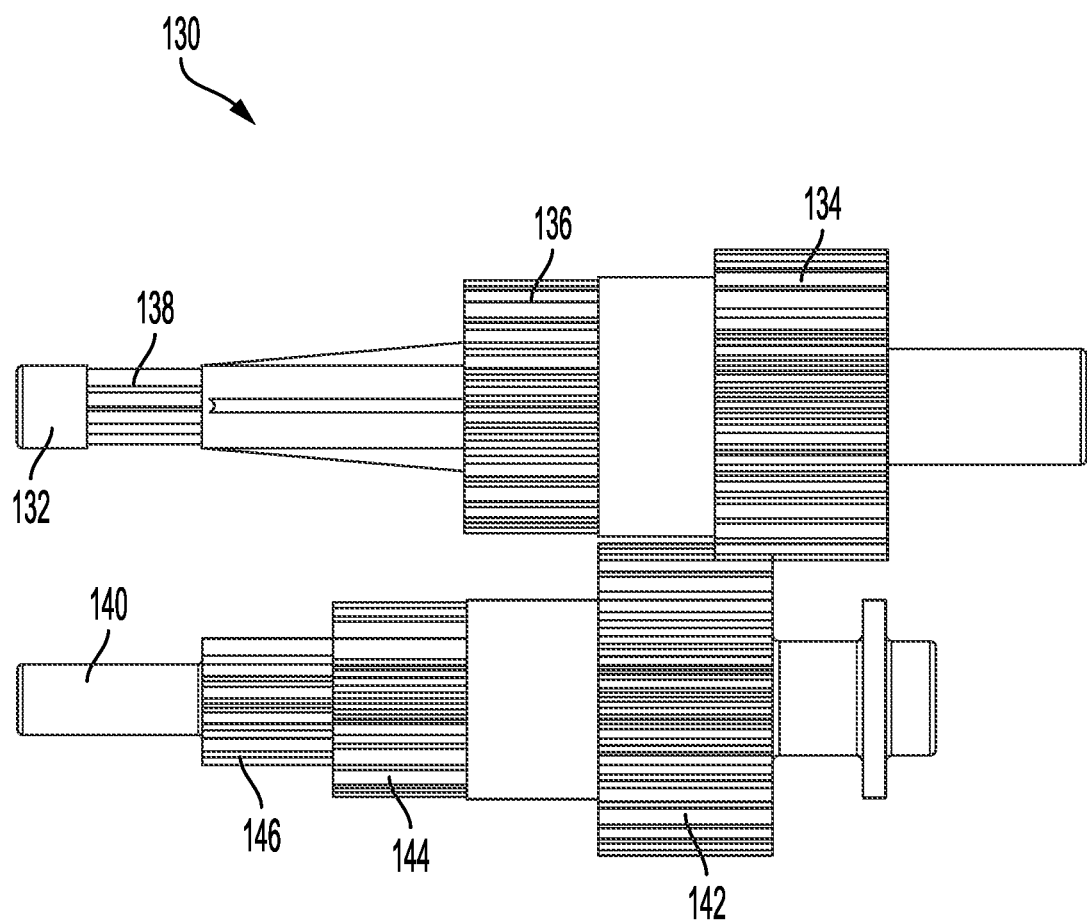
FIG. 7 is a top-down view of a plurality of gears of the head-measuring device of FIG. 1, in accordance with an example embodiment.

FIG. 7 depicts a top-down view of the plurality of gears 130 for achieving the aforementioned predetermined proportions. FIG. 7 shows the first shaft 132 having gear 134, gear 136, and gear 138, as well as the second shaft 140 having gear 142, gear 144, and gear 146. In this example, and with reference to FIGS. 4, 5, and 6, gear 134 can drive movement of the first outermost arm 112 (e.g., the top of skull axis), gear 142 can drive movement of the second outermost arm 116 (e.g., the tip of chin axis), gear 136 and gear 138 can drive movement of the first subset of movable arms 114 (e.g., the hairline axis and eyebrow axis), and gear 144 and gear 146 can drive movement of the second subset of movable arms 118 (e.g., the nose axis and mouth axis).

Table 1 shown below provides example specifications for the plurality of gears 130 and the plurality of movable arms 104 described above, some of which are represented in millimeters (mm). The specifications provided in Table 1 can facilitate all of movable arms of the plurality of movable arms 104 moving synchronously at a velocity that corresponds to the proportional percentages.

TABLE 1

| Movable Arm/Axis | Proportional Percentage (%) | Number of Teeth on Gear | Number of Teeth on Respective First Elongated Portion | Gear Pitch Diameter (mm) | Outer Diameter of Gear (mm) |
| --- | --- | --- | --- | --- | --- |
| Top of Skull | 50 | 60 | 98 | 30 | 31 |
| Hairline | 40 | 48 | 82 | 24 | 25 |
| Eyebrow | 10 | 12 | 24 | 6 | 7 |
| Nose | 20 | 24 | 40 | 12 | 13 |
| Mouth | 30 | 36 | 60 | 18 | 19 |
| Tip of Chin | 50 | 60 | 98 | 30 | 31 |

In some examples, each gear can have the same module, where the module for a particular gear is defined as the gear pitch diameter divided by the number of teeth on the gear. For instance, using the specifications in Table 2, the module of each gear is 0.5. When the module of each gear is the same, this can help ensure that the gears of varying pitch diameters mate (or mesh) properly.

The head-measuring device 100 can be configured for use with drawing or painting heads having a maximum height of h=x and heads having a minimum height of h=y. FIG. 8 illustrates a top-down view of the head-measuring device 100 with the plurality of movable arms 104 at a maximum opening distance, x. As shown, and in accordance with the above-described proportions, the top of skull and tip of chin axes are each approximately 0.5(x) from the eye axis (thus, the distance between these two axes is equal to the maximum opening distance, x), the hairline axis is 0.4(x) from the eye axis, the eyebrow axis is 0.1(x) from the eye axis, the nose axis is 0.2(x) from the eye axis, and the mouth axis is 0.3(x) from the eye axis.

These proportions can be the same with the plurality of movable arms 104 at a minimum opening distance, y. FIG. 9 illustrates a top-down view of the head-measuring device 100 with the plurality of movable arms 104 at a maximum opening distance, y. As shown, and in accordance with the above-described proportions, the top of skull and tip of chin axes are each approximately 0.5(y) from the eye axis (thus, the distance between these two axes is equal to the minimum opening distance, y), the hairline axis is 0.4(y) from the eye axis, the eyebrow axis is 0.1(y) from the eye axis, the nose axis is 0.2(y) from the eye axis, and the mouth axis is 0.3(y) from the eye axis.

Table 2 shown below summarizes the proportions described above, particularly indicating where each arm/axis will be with respect to the stationary arm 106 (e.g., the eye axis, which is the origin) when using the head-measuring device 100 to draw a head having a minimum height of 12.7 cm (5 in) and a head having a maximum height of 30.48 cm (12 in), by way of example. All distances in Table 2 are represented in inches.

TABLE 2

| Arm/Axis | Proportional Percentage (%) | Distance of Arm/Axis From Eye Axis (in) (x = 12 in) | Distance of Arm/Axis From Eye Axis (in) (y = 5 in) |
| --- | --- | --- | --- |
| Top of Skull | 50 | 6 | 2.5 |
| Hairline | 40 | 4.8 | 2 |
| Eyebrow | 10 | 1.2 | 0.5 |
| Eye | 0 | 0 | 0 |
| Nose | 20 | −2.4 | −1 |
| Mouth | 30 | −3.625 | −1.5 |
| Tip of Chin | 50 | −6 | −2.5 |

Table 3 shown below summarizes the proportions described above, particularly indicating where each arm/axis will be with respect to the stationary arm 106 (e.g., the eye axis, which is the origin) when using the head-measuring device 100 to draw a head having a minimum height of 11.96848 cm (4.712 in) and a head having a maximum height of 25.4 cm (10 in), by way of example. All distances in Table 3 are represented in inches.

TABLE 3

| Arm/Axis | Proportional Percentage (%) | Distance of Arm/Axis From Eye Axis (in) (x = 10 in) | Distance of Arm/Axis From Eye Axis (in) (y = 4.712 in) |
| --- | --- | --- | --- |
| Top of Skull | 50 | 5 | 2.356 |
| Hairline | 40 | 4 | 1.884 |
| Eyebrow | 10 | 1 | 0.471 |
| Eye | 0 | 0 | 0 |
| Nose | 20 | −2 | −0.943 |
| Mouth | 30 | −3 | −1.414 |
| Tip of Chin | 50 | −5 | −2.356 |

It should be understood that the predetermined proportions described with respect to the Figures herein are for purposes of example and that the head-measuring device 100 (e.g., the movable arms, stationary arm, gears, etc.) can be configured, reconfigured, sized, resized, repositioned in the housing or otherwise with respect to the support frame 102, to achieve or support other proportions and human head heights as well. Because the plurality of movable arms 104 are mechanically linked and move synchronously, these same proportions can be achieved when the plurality of movable arms 104 are moved to draw human heads having other heights as well.

FIGS. 10, 11, 12, and 13 next illustrate another form that the head-measuring device 100 can take.

Figure 10:
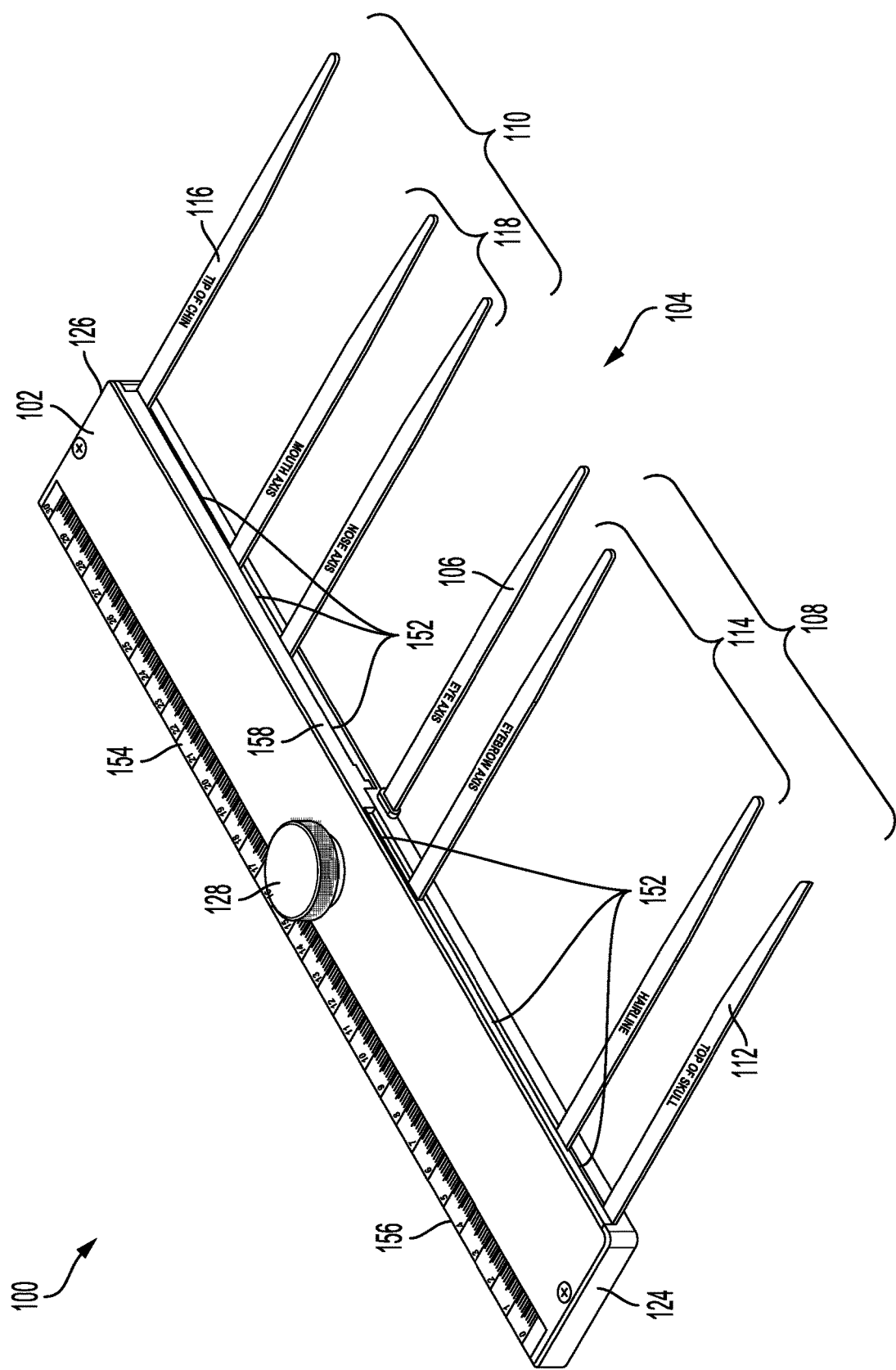
FIG. 10 is a perspective view of another head-measuring device, in accordance with an example embodiment.

FIG. 10, for instance, is a perspective view of the head-measuring device 100 in the first position. In addition to some of the components described above with respect to FIG. 1, the head-measuring device 100 of FIG. 10 includes a plurality of slots 152 disposed in the support frame 102 (e.g., the side of the support frame 102 from which the arms protrude). The plurality of slots 152 limit the range over which the plurality of movable arms 104 can move. The head-measuring device 100 of FIG. 10 also includes a ruler 154, which can be coupled to or integrated as part of the support frame 102. As shown in FIG. 10, the ruler 154 can be located along a length of one side 156 of the support frame 102, opposite from another side 158 of the housing from which the stationary arm 106 extends. In some examples, the ruler 154 can be a detachable ruler made of sheet steel or other material and can be coupled to and decoupled from the support frame 102, such as by way of a snap-fit mechanism, magnetic attachment, or other method of attaching one component to another. The ruler 154 can include one or more units of measurement, such as imperial and/or metric. Other examples are possible as well.

Figure 11:
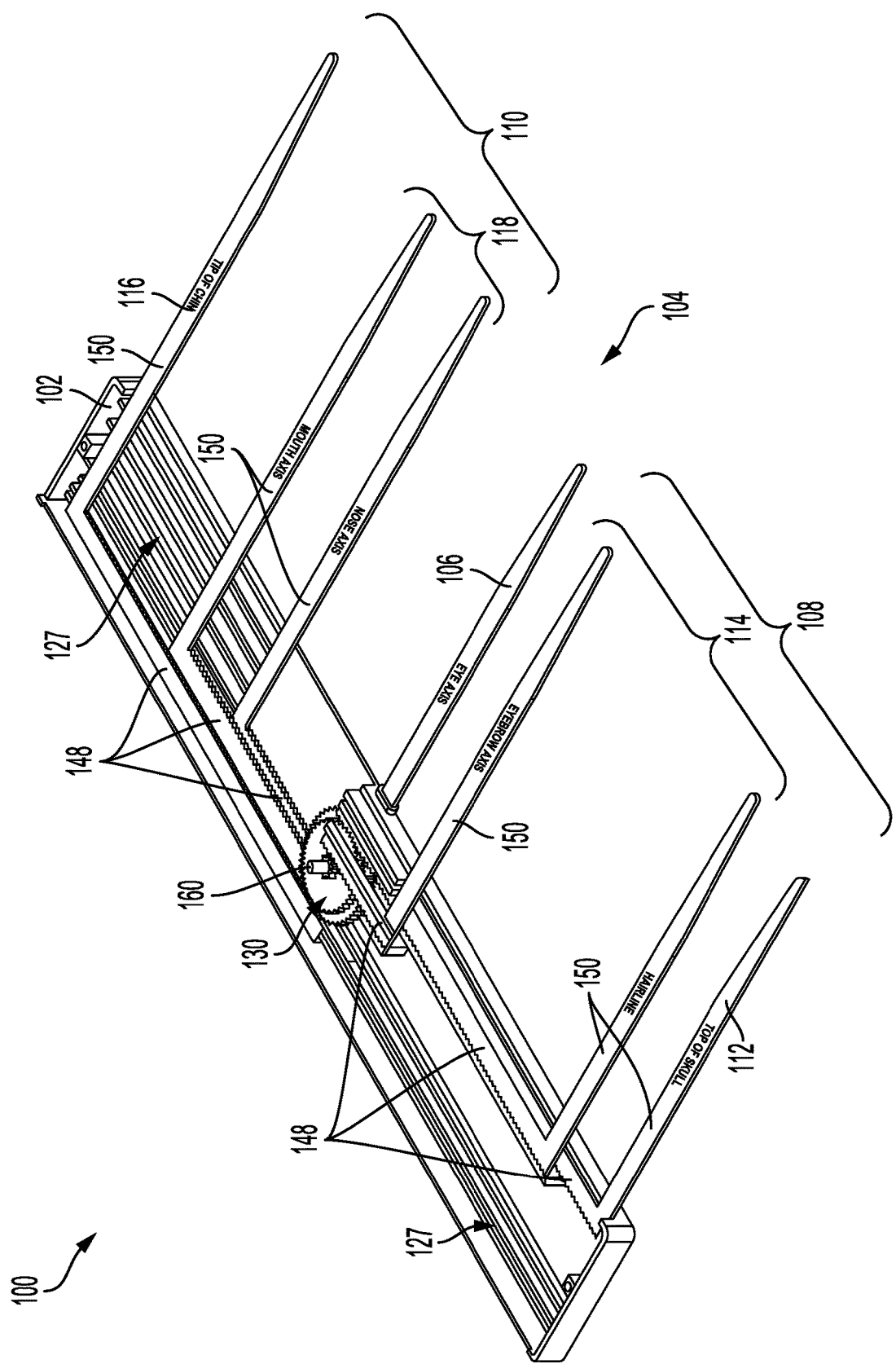
FIG. 11 is another perspective view of the head-measuring device of FIG. 10, in accordance with an example embodiment.

FIG. 11 is another perspective view of the head-measuring device 100 of FIG. 10 in the first position, particularly a version of the head-measuring device 100 where a top portion of the support frame 102 housing is removed to show what is inside. In particular, the head-measuring device 100 is shown to include the plurality of gears 130 that are coupled to the support frame 102. The plurality of gears 130 are shown to be arranged in a single stacked arrangement (compared to the two stacks of the embodiments shown in FIGS. 1-9) and coupled to the support frame 102 via a shaft 160. Each gear of the plurality of gears 130 is coupled to the shaft 160. Although not shown in FIG. 11, the shaft 160 can be coupled to the actuator 128. The opposing movement of the first set of movable arms 108 and the second set of movable arms 110 can be the result of installing the sets of movable arms diametrically opposite each other on the stacked gear arrangement.

Figure 12:
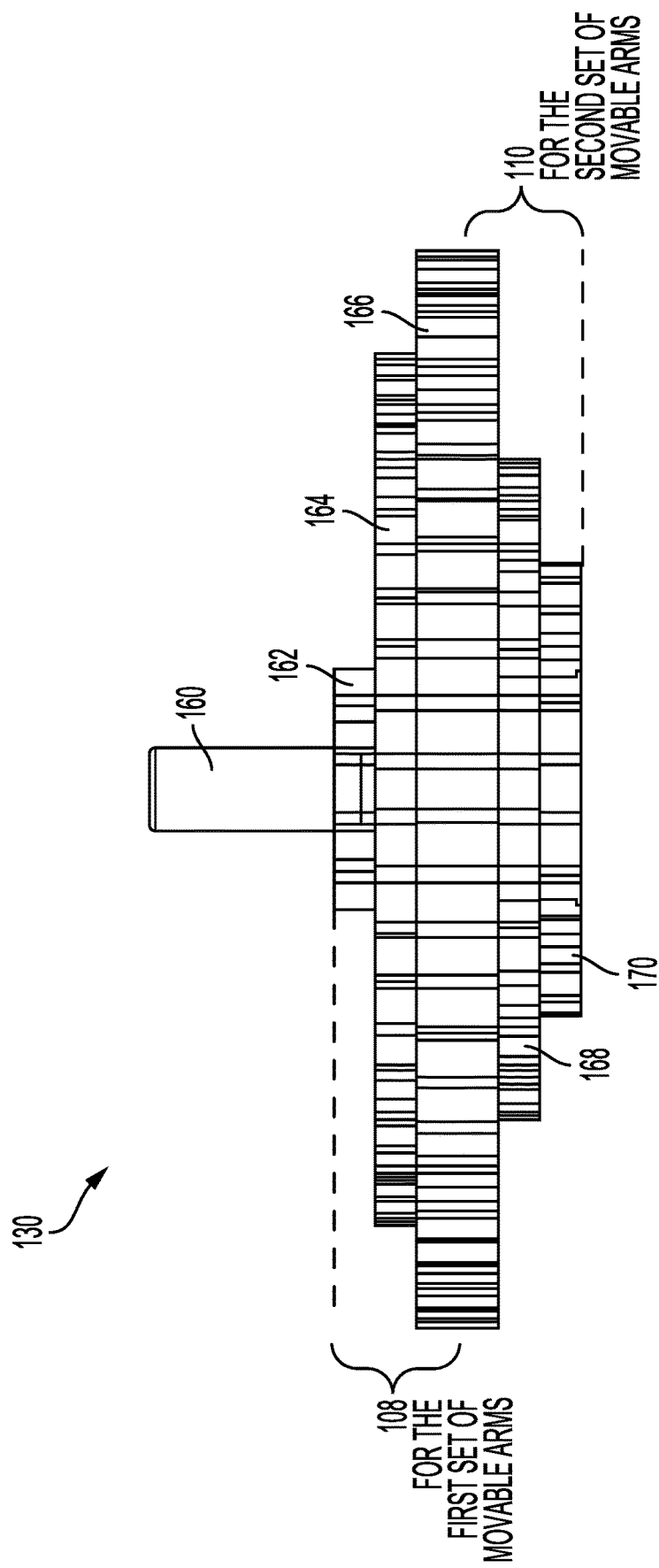
FIG. 12 is a side view of a plurality of gears of the head-measuring device of FIG. 10, in accordance with an example embodiment.

FIG. 12 is a side view of another example of the plurality of gears 130 of the head-measuring device 100, particularly the embodiment of the plurality of gears 130 shown in the head-measuring device of FIGS. 10 and 11. As shown, the plurality of gears 130 can include five gears in a stacked arrangement including, from top to bottom, gear 162, gear 164, gear 166, gear 168, and gear 170. FIG. 12 also shows the shaft 160 that is coupled to the actuator 128 (not explicitly shown in FIG. 12). The number of gears can vary depending on how many movable arms are included as part of the head-measuring device 100.

Figure 13:
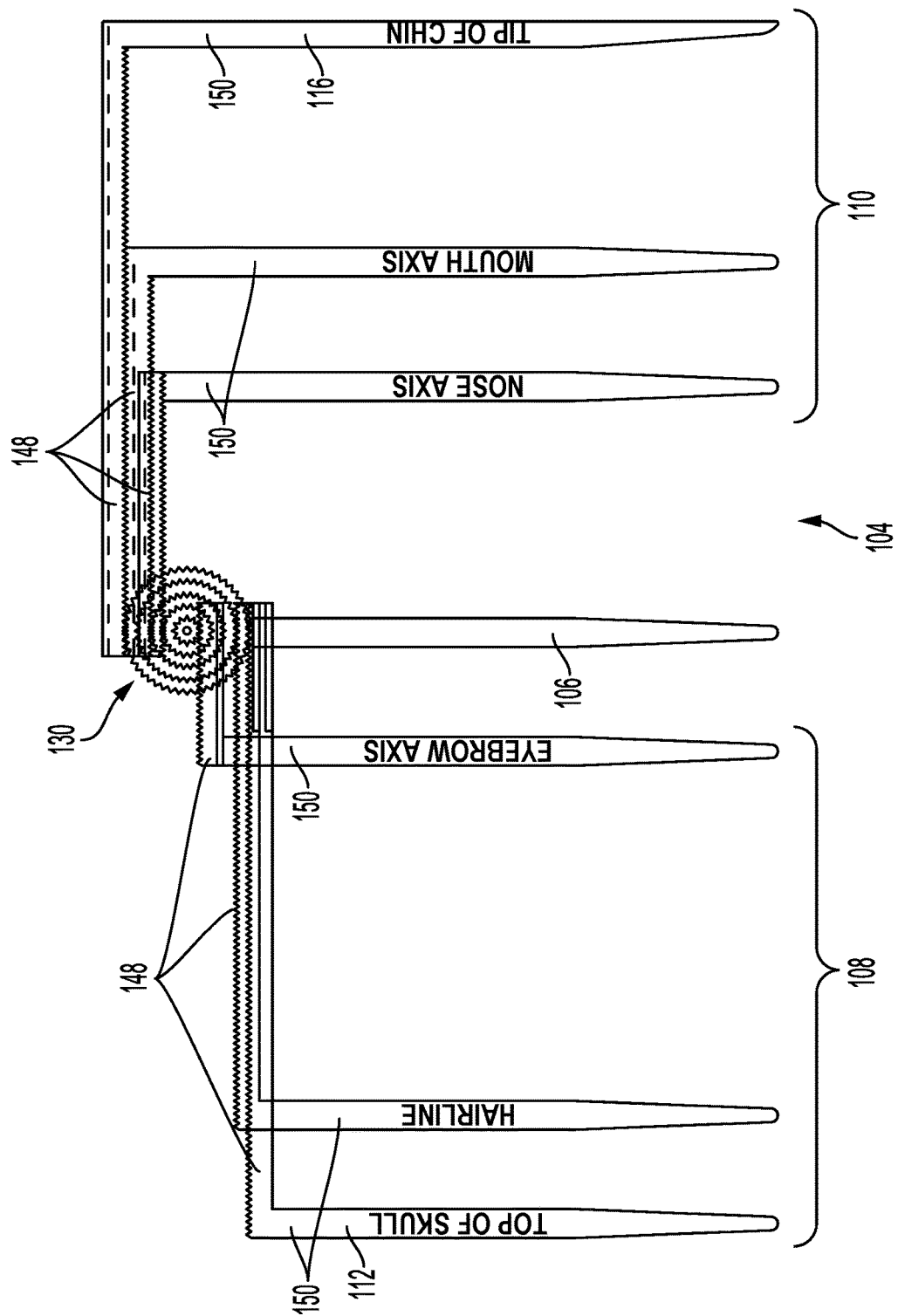
FIG. 13 is a top-down view of the plurality of gears, the plurality of movable arms, and the stationary arm of the head-measuring device of FIG. 10, in accordance with an example embodiment.

FIG. 13 is a top-down view of the plurality of gears 130, the plurality of movable arms 104, and the stationary arm 106 of the head-measuring device 100. In FIG. 13, the first elongated portions 148 are partially transparent to help show which elongated portions engage with which gears.

In some examples, the first outermost arm 112 (for the top of skull axis) and the second outermost arm 116 (for the tip of chin axis) can both engage with gear 166. Thus, gear 166 can be thicker to accommodate the respective first elongated portions of the first outermost arm 112 and the second outermost arm 116. In other examples, however, instead of one gear, two gears of the same or similar size to gear 166 can be used, each engaged with a respective one of the first outermost arm 112 and the second outermost arm 116. In addition, the first elongated portions of the first subset of movable arms 114 can engage with gear 162 and gear 164—namely, the movable arm for the hairline axis can engage with gear 164 and the movable arm for the eyebrow axis can engage with gear 162. Further, the first elongated portions of the second subset of movable arms 118 can engage with gear 168 and gear 170—namely, the movable arm for the nose axis can engage with gear 170 and the movable arm for the mouth axis can engage with gear 168.

Figure 14:
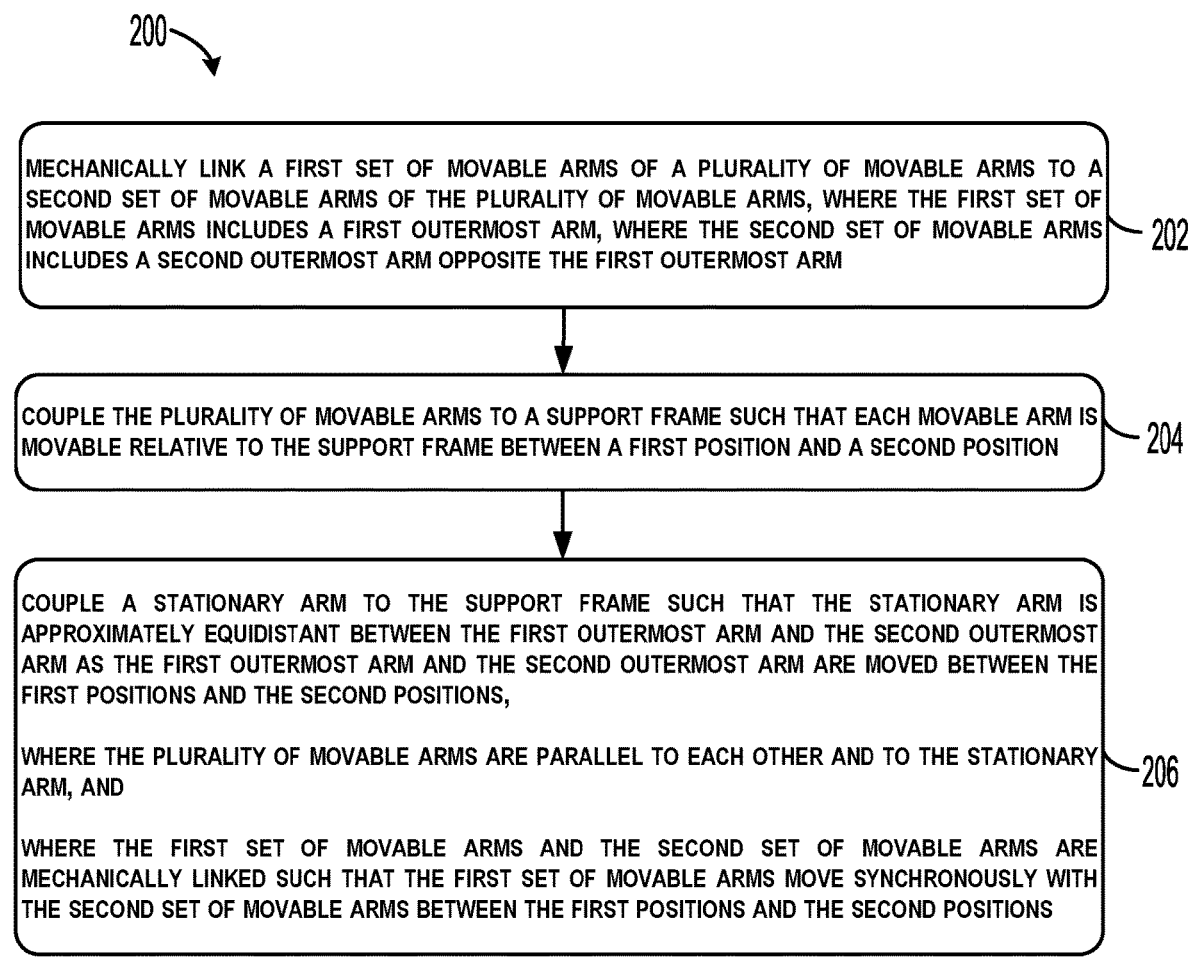
FIG. 14 is a flow chart depicting example operations, in accordance with an example embodiment.

FIG. 14 is a flow chart depicting example operations, in accordance with an example embodiment. In particular, the flow chart of FIG. 14 depicts an example of a method 200 for assembling a head-measuring device, such as the head-measuring device 100 described above. Method 200 may include one or more operations, functions, or actions as illustrated by one or more of blocks 202-206.

At block 202, functions include mechanically linking a first set of movable arms of a plurality of movable arms to a second set of movable arms of the plurality of movable arms, where the first set of movable arms includes a first outermost arm, and where the second set of movable arms includes a second outermost arm opposite the first outermost arm.

At block 204, functions include coupling the plurality of movable arms to a support frame such that each movable arm is movable relative to the support frame between a first position and a second position.

At block 206, functions include coupling a stationary arm to the support frame such that the stationary arm is approximately equidistant between the first outermost arm and the second outermost arm as the first outermost arm and the second outermost arm are moved between the first positions and the second positions, where the plurality of movable arms are parallel to each other and to the stationary arm, and where the first set of movable arms and the second set of movable arms are mechanically linked such that the first set of movable arms move synchronously with the second set of movable arms between the first positions and the second positions.

In some embodiments, the first set of movable arms and the second set of movable arms are mechanically linked such that relative positions between the plurality of movable arms correspond to predetermined proportions associated with a human head and maintain the predetermined proportions during the synchronous movement of the first set of movable arms with the second set of movable arms.

In some embodiments, each movable arm corresponds to a respective axis of a human head.

In some embodiments, the stationary arm corresponds to an eye axis of a human head, the first outermost arm corresponds to a top of skull axis of the human head, and the second outermost movable arm corresponds to a tip of chin axis of the human head. In such embodiments, the first set of movable arms can further include a first subset of movable arms positioned between the stationary arm and the first outermost arm and corresponding to one or more of a hairline axis of the human head or an eyebrow axis of the human head, and the second set of movable arms can further include a second subset of movable arms positioned between the stationary arm and the second outermost movable arm and corresponding to one or more of a nose axis of the human head or a mouth axis of the human head.

In some embodiments, method 200 also involves coupling a plurality of gears to the support frame, where an actuator is attached to the plurality of gears and configured to rotate the plurality of gears and cause the synchronous movement of the first set of movable arms with the second set of movable arms. In such embodiments, the act of mechanically linking the first set of movable arms to the second set of movable arms can involve mechanically engaging the first set of movable arms with a first set of gears of the plurality of gears and mechanically engaging the second set of movable arms with a second set of gears of the plurality of gears. Further, in such embodiments, each movable arm might include a first elongated portion including arm teeth engaged with gear teeth of a respective gear of the plurality of gears, and a second elongated portion defining a respective axis of a human head, where the second elongated portions of the plurality of movable arms are parallel to each other and to the stationary arm, and where the acts of mechanically engaging the first set of movable arms with the first set of gears of the plurality of gears and mechanically engaging the second set of movable arms with the second set of gears of the plurality of gears can involve engaging the arm teeth of the first elongated portions of the first set of movable arms with the gear teeth of the first set of gears, and engaging the arm teeth of the first elongated portions of the second set of movable arms with the gear teeth of the second set of gears. Still further, in such embodiments, the first elongated portions can be substantially perpendicular to the second elongated portions. Yet still further, in such embodiments, the support frame can be a housing, and the act of coupling the plurality of movable arms to the support frame can involve coupling, and at least partially disposing, the first elongated portions of the plurality of movable arms within the housing.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A head-measuring device comprising:
a support frame;
a plurality of movable arms comprising a first set of movable arms and a second set of movable arms, wherein the first set of movable arms includes a first outermost arm, wherein the second set of movable arms includes a second outermost arm opposite the first outermost arm, and wherein each movable arm is movable between a first position and a second position; and
a stationary arm coupled to the support frame such that the stationary arm is approximately equidistant between the first outermost arm and the second outermost arm as the first outermost arm and the second outermost arm are moved between the first positions and the second positions,
wherein the plurality of movable arms are parallel to each other and to the stationary arm, and
wherein the first set of movable arms and the second set of movable arms are mechanically linked such that the first set of movable arms move synchronously with the second set of movable arms between the first positions and the second positions.

2. The head-measuring device of claim 1, wherein the first set of movable arms and the second set of movable arms are mechanically linked such that relative positions between the plurality of movable arms correspond to predetermined proportions associated with a human head and maintain the predetermined proportions during the synchronous movement of the first set of movable arms with the second set of movable arms.

3. The head-measuring device of claim 1, wherein each movable arm corresponds to a respective axis of a human head.

4. The head-measuring device of claim 1, wherein the stationary arm corresponds to an eye axis of a human head,
wherein the first outermost arm corresponds to a top of skull axis of the human head, and
wherein the second outermost movable arm corresponds to a tip of chin axis of the human head.

5. The head-measuring device of claim 4, wherein the first set of movable arms further includes a first subset of movable arms positioned between the stationary arm and the first outermost arm and corresponding to one or more of a hairline axis of the human head or an eyebrow axis of the human head, and
wherein the second set of movable arms further includes a second subset of movable arms positioned between the stationary arm and the second outermost movable arm and corresponding to one or more of a nose axis of the human head or a mouth axis of the human head.

6. The head-measuring device of claim 1, further comprising:
a plurality of gears coupled to the support frame, wherein the first set of movable arms and the second set of movable arms are mechanically linked by the plurality of gears; and
an actuator attached to the plurality of gears and configured to rotate the plurality of gears and cause the synchronous movement of the first set of movable arms with the second set of movable arms,
wherein each movable arm comprises:
a first elongated portion including arm teeth engaged with gear teeth of a respective gear of the plurality of gears, and
a second elongated portion defining a respective axis of a human head; and
wherein the second elongated portions of the plurality of movable arms are parallel to each other and to the stationary arm.

7. The head-measuring device of claim 6, wherein the first elongated portions are substantially perpendicular to the second elongated portions.

8. The head-measuring device of claim 6, wherein the support frame is a housing,
wherein the plurality of gears are at least partially disposed within the housing, and
wherein the first elongated portions of the plurality of movable arms are at least partially disposed within the housing.

9. The head-measuring device of claim 6, wherein the actuator is a rotatable knob.

10. The head-measuring device of claim 8, wherein the housing includes a ruler located along a length of one side of the housing, opposite from another side of the housing from which the stationary arm extends.

11. The head-measuring device of claim 10, wherein the ruler is detachable from the housing.

12. A method for assembling a head-measuring device, the method comprising:
mechanically linking a first set of movable arms of a plurality of movable arms to a second set of movable arms of the plurality of movable arms, wherein the first set of movable arms includes a first outermost arm, and wherein the second set of movable arms includes a second outermost arm opposite the first outermost arm;
coupling the plurality of movable arms to a support frame such that each movable arm is movable relative to the support frame between a first position and a second position; and
coupling a stationary arm to the support frame such that the stationary arm is approximately equidistant between the first outermost arm and the second outermost arm as the first outermost arm and the second outermost arm are moved between the first positions and the second positions,
wherein the plurality of movable arms are parallel to each other and to the stationary arm, and
wherein the first set of movable arms and the second set of movable arms are mechanically linked such that the first set of movable arms move synchronously with the second set of movable arms between the first positions and the second positions.

13. The method of claim 12, wherein the first set of movable arms and the second set of movable arms are mechanically linked such that relative positions between the plurality of movable arms correspond to predetermined proportions associated with a human head and maintain the predetermined proportions during the synchronous movement of the first set of movable arms with the second set of movable arms.

14. The method of claim 12, wherein each movable arm corresponds to a respective axis of a human head.

15. The method of claim 12, wherein the stationary arm corresponds to an eye axis of a human head,
wherein the first outermost arm corresponds to a top of skull axis of the human head, and
wherein the second outermost movable arm corresponds to a tip of chin axis of the human head.

16. The method of claim 15, wherein the first set of movable arms further includes a first subset of movable arms positioned between the stationary arm and the first outermost arm and corresponding to one or more of a hairline axis of the human head or an eyebrow axis of the human head, and wherein the second set of movable arms further includes a second subset of movable arms positioned between the stationary arm and the second outermost movable arm and corresponding to one or more of a nose axis of the human head or a mouth axis of the human head.

17. The method of claim 12, further comprising:

coupling a plurality of gears to the support frame, wherein an actuator is attached to the plurality of gears and configured to rotate the plurality of gears and cause the synchronous movement of the first set of movable arms with the second set of movable arms, wherein mechanically linking the first set of movable arms to the second set of movable arms comprises mechanically engaging the first set of movable arms with a first set of gears of the plurality of gears and mechanically engaging the second set of movable arms with a second set of gears of the plurality of gears.

18. The method of claim 17, wherein each movable arm comprises:

a first elongated portion including arm teeth engaged with gear teeth of a respective gear of the plurality of gears, and a second elongated portion defining a respective axis of a human head, wherein the second elongated portions of the plurality of movable arms are parallel to each other and to the stationary arm, and wherein mechanically engaging the first set of movable arms with the first set of gears of the plurality of gears and mechanically engaging the second set of movable arms with the second set of gears of the plurality of gears comprises:

engaging the arm teeth of the first elongated portions of the first set of movable arms with the gear teeth of the first set of gears, and engaging the arm teeth of the first elongated portions of the second set of movable arms with the gear teeth of the second set of gears.

19. The method of claim 18, wherein the first elongated portions are substantially perpendicular to the second elongated portions.

20. The method of claim 18, wherein the support frame is a housing, and wherein coupling the plurality of movable arms to the support frame comprises coupling, and at least partially disposing, the first elongated portions of the plurality of movable arms within the housing.

\* \* \* \* \*